(12) United States Patent
Livoti et al.

(10) Patent No.: US 12,155,896 B2
(45) Date of Patent: *Nov. 26, 2024

(54) METHODS AND APPARATUS TO AUTOMATE RECEIVABILITY UPDATES FOR MEDIA CREDITING

(71) Applicant: The Nielsen Company (US), LLC, New York, NY (US)

(72) Inventors: John T. Livoti, Clearwater, FL (US); Stanley Wellington Woodruff, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,935

(22) Filed: Jul. 25, 2023

(65) Prior Publication Data

US 2023/0370680 A1 Nov. 16, 2023

Related U.S. Application Data

(63) Continuation of application No. 17/478,854, filed on Sep. 17, 2021, now Pat. No. 11,758,226.

(51) Int. Cl.
*H04N 21/45* (2011.01)
*H04N 21/462* (2011.01)

(52) U.S. Cl.
CPC ....... *H04N 21/462* (2013.01); *H04N 21/4532* (2013.01)

(58) Field of Classification Search
None
See application file for complete search history.

(56) References Cited

U.S. PATENT DOCUMENTS

| 11,758,226 B2 * | 9/2023 | Livoti | H04N 21/462 |
| | | | 725/14 |
| 2013/0340015 A1 * | 12/2013 | Magis | H04N 21/43615 |
| | | | 725/82 |
| 2014/0053225 A1 * | 2/2014 | Shoykher | H04N 21/4755 |
| | | | 725/132 |

* cited by examiner

*Primary Examiner* — Jefferey F Harold
*Assistant Examiner* — Charles N Hicks

(57) ABSTRACT

Methods, apparatus, systems, and articles of manufacture are disclosed to automate receivability updates for media crediting. At least one non-transitory machine-readable medium comprises instructions that, when executed, cause at least one processor to at least identify a station identifier associated with at least one of a signature or a code, the at least one of the signature or the code collected at a panelist household. The instructions, when executed, cause at least one processor to further determine whether a household receivability table includes the station identifier, to determine, in response to a determination that the household receivability table does not include a station corresponding to the station identifier, whether the station is receivable at the panelist household, and to update the household receivability table, the update in response to a determination that the station corresponding to the station identifier is receivable at the panelist household.

20 Claims, 8 Drawing Sheets

METHODS AND APPARATUS TO AUTOMATE RECEIVABILITY UPDATES FOR MEDIA CREDITING

CROSS-REFERENCE TO RELATED APPLICATIONS

This application is a continuation of U.S. patent application Ser. No. 17/478,854, now U.S. Pat. No. 11,758,226, filed Sep. 17, 2021. Priority to U.S. patent application Ser. No. 17/478,854 is hereby claimed. U.S. patent application Ser. No. 17/478,854 is hereby incorporated herein in its entirety.

FIELD OF THE DISCLOSURE

This disclosure relates generally to media crediting and, more particularly, to methods and apparatus to automate receivability updates for media crediting.

BACKGROUND

In recent years, media availability has evolved. Audiences may access media from stations received over an antenna, cable, or set top box (STB). Certain stations may be only available to viewers who purchase additional packages or live in a particular region. The stations that viewers in a household have access to are collectively referred to as that household's receivability.

Figure 1:
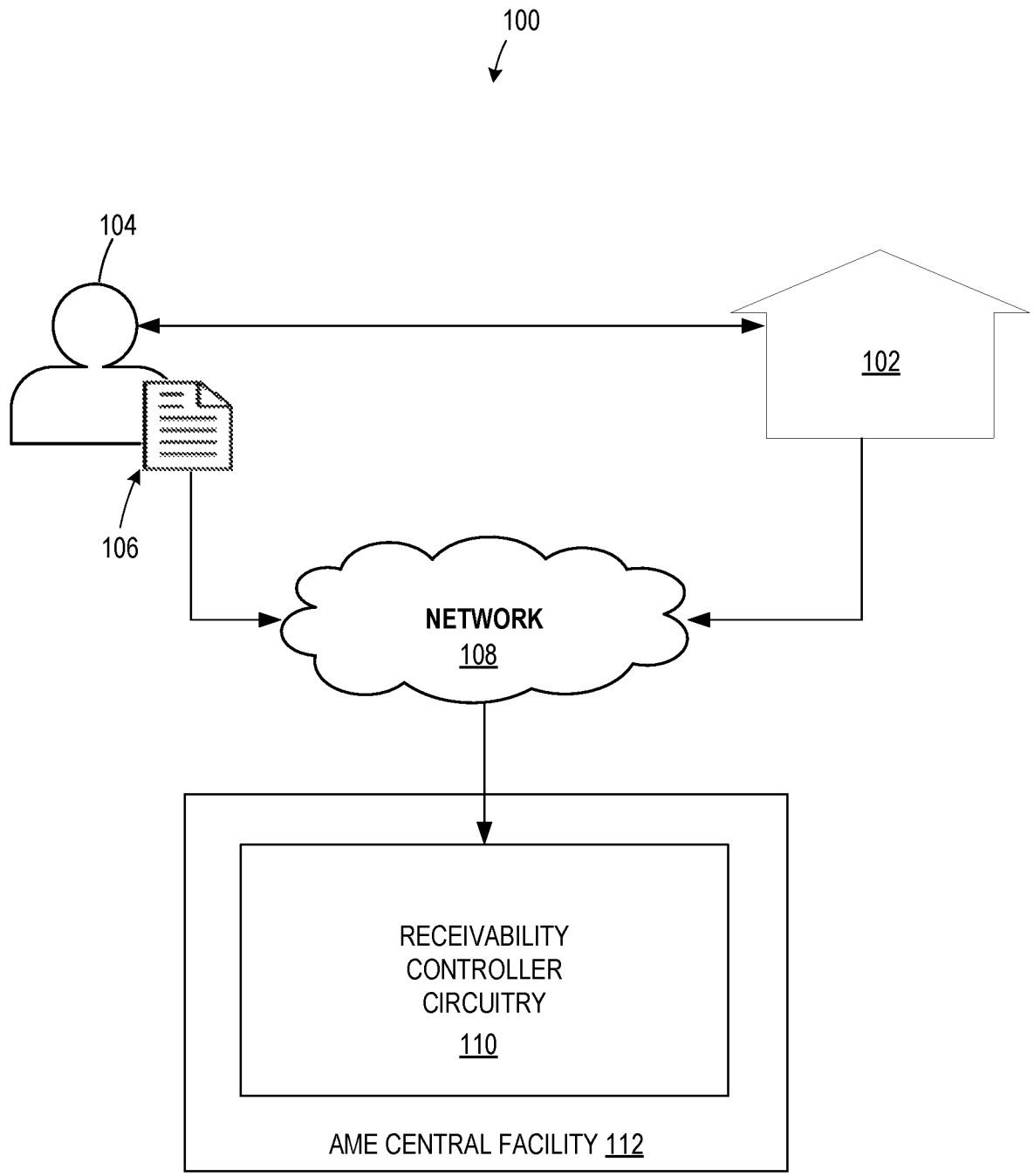
FIG. 1 is an example system to automate receivability updates for media crediting.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+1-1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Many entities have an interest in understanding how users are exposed to media on a television station. For example, an audience measurement entity (AME) may want to monitor media presentations made at the television to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc., of an audience for media. For example, media (e.g., audio and/or video media) may be distributed by a media distributor to media consumers. Content distributors, advertisers, content producers, etc. have an interest in knowing the size of an audience for media by the media distributor, the extent to which an audience consumes the media, whether the audience pauses, rewinds, fast-forwards the media, etc. In some examples, the term "content" includes programs, advertisements, clips, shows, etc., In the disclosed examples, the term "media" includes any type of audio and/or visual content and/or advertisement. In some examples, such media is delivered via broadcast television. However, in some other examples, the media be delivered via delivery mechanisms other than broadcast television. Thus, media includes television programming and/or advertisements, movies, TV shows, etc. Unless context clearly dictates otherwise, for ease of explanation, "media" refers to a piece of media (e.g., movie, TV show, etc.) in its entirety.

In some examples, AMEs identify media by extracting media identifiers such as fingerprints, signatures, and/or media-identifying metadata, such as codes, watermarks, etc., and comparing them to reference media identifiers. For example, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A reference media signature may be a series of constituent media signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean any proxy for identifying media that is generated from one or more inherent characteristics of the media.

When media is successfully identified from audio/visual data of a viewing session, an AME may choose to credit the identified media and/or station (e.g., a television station via which the media was distributed). When media and/or a station is credited, information from the viewing session that produced said accreditation may be used by the AME for determining ratings or for other analysis. If media from a viewing session cannot be successfully identified, the AME may not use the information for determining ratings or for other analysis.

Successfully identifying media is a challenging task. Part of this challenge is due to the large and expanding set of media and stations available to the public. To limit the number of potential matches and reduce the challenge of identification, AMEs store a receivability table for households with panelists. A panelist is a viewer who agrees to share their viewing data with the AME. The receivability table of a given household lists all the stations that panelists in the household have access to. Therefore, AMEs may require that an identified station providing media be listed on the household's receivability table for the media to be successfully identified.

A receivability table for a household is initially created during the meter installation process at the household. The receivability table remains accurate until the household gains access to new stations on their one or more televisions. When this occurs, viewed media from the new stations cannot be successfully identified or credited until the receivability table is updated. With previously known approaches, an employee of the AME manually updates a receivability table by, for example, visiting or calling the associated household. As such, manually updating a receivability table is a time consuming task.

FIG. 1 is an example system to automate receivability updates for media crediting in accordance with the teachings of this disclosure. The example system 100 includes a panelist household 102, an employee 104, a receivability table 106, an example network 108, example receivability controller circuitry 110, and an AME central facility 112.

The panelist household 102 of FIG. 1 includes panelists who agree to share their viewing data with an example AME. The panelist household 102 additionally includes one or more televisions, which the panelists use to view media during a viewing session. When media is viewed in the household, the installed meter collects codes and/or other signatures from the audio/visual data of the viewing session. The example receivability controller circuitry 110 receives the collected codes and/or signatures from the meter via the example network 108.

In the example system 100, the employee 104 of FIG. 1 works for the example AME. In other examples, the employee 104 is any human. When the panelists first agree to share their viewing data with the example AME, the employee 104 visits the panelist household 102 to install a meter. The meter is a tool that captures audio/visual data from the viewing session, so that stations and/or associated media may be identified and credited. During the meter installation, the employee 104 generates the receivability table 106. In the example system 100, the employee 104 uses a template that estimates what stations may populate the receivability table 106. One or more televisions may complete parts of the template when scanning for channels. If the form is not completed, the employee 104 may manually scroll through stations to complete the receivability table 106. In some examples, the employee 104 generates the receivability table 106 without a template.

The example network 108 of FIG. 1 connects and facilitates communication between the panelist household 102, employee 104, and example receivability controller circuitry 110. In this example, the example network 108 is the Internet. However, the example network 108 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The receivability table 106 is a list of stations that panelists in the panelist household 102 can access. In the example system 100, the employee provides the receivability table 106 to the example receivability controller circuitry 110 via the example network 108. In some examples, the receivability table 106 is provided to the example receivability controller circuitry 110 through a direct connection that does not utilize the example network 108. In the example system 100, the employee's 104 use of the example network 108 may be achieved through any internet capable device. In some examples, the internet capable device is the meter installed in the panelist household 102. In other examples, a different internet capable device is used.

The example receivability controller circuitry 110 is operated at the AME central facility 112 and receives the receivability table 106 from the employee 104 via the example network 108. The example receivability controller circuitry 110 also receives collected codes and/or signatures from the panelist household 102. The codes and/or signatures are used to credit stations and/or associated media, and to update the receivability table 106. The example receivability controller circuitry 110 is explored further in FIGS. 2, 3.

By using the example receivability controller circuitry 110, the example AME gains the ability to automatically update the receivability table 106. This saves time and cost in comparison to known methods where the employee 104 manually updates the receivability table 106.

Figure 2:
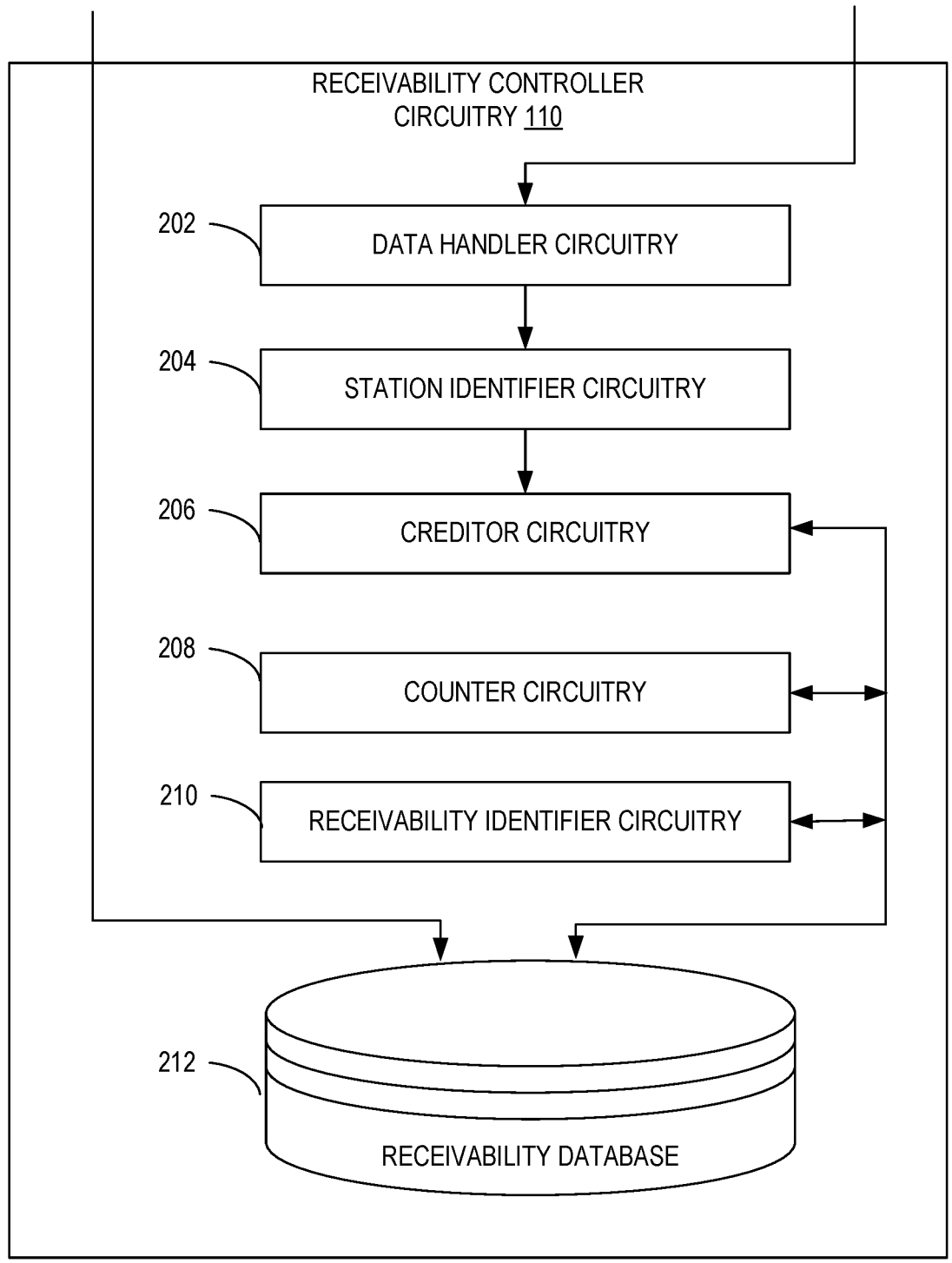
FIG. 2 is a block diagram of an example implementation of the example receivability controller circuitry of FIG. 1.

FIG. 2 is a block diagram of an example implementation of the example receivability controller circuitry of FIG. 1. The example receivability controller circuitry 110 includes example data handler circuitry 202, example station identifier circuitry 204, example creditor circuitry 206, example counter circuitry 208, example receivability identifier circuitry 210, and an example receivability database 212.

The example data handler circuitry 202 of FIG. 2 collects codes and/or signatures from the panelist household 102. The codes and/or signatures identify a media and a station viewed during a viewing session. The example data handler circuitry 202 provides the codes and/or signatures to the example station identifier circuitry 204.

The example station identifier circuitry 204 of FIG. 2 identifies a station from the codes and/or signatures from the example data handler circuitry 202. The identified station is associated with a station identifier (SID) that is present within the codes and/or signatures. The example station identifier circuitry 204 provides the identified station and SID to the example creditor circuitry 206.

In some examples, the receivability controller circuitry 110 includes means for identifying a station identifier associated with at least one of a signature or a code. For example, the means for identifying may be implemented by example station identifier circuitry 204. In some examples, the example station identifier circuitry 204 may be implemented by machine executable instructions such as that implemented by at least block 404 of FIG. 4 executed by processor circuitry, which may be implemented by the example processor circuitry 512 of FIG. 5, the example processor circuitry 600 of FIG. 6, and/or the example Field Programmable Gate Array (FPGA) circuitry 700 of FIG. 7. In other examples, the example station identifier circuitry 204 is implemented by other hardware logic circuitry, hardware implemented state machines, and/or any other combination of hardware, software, and/or firmware. For example, the example station identifier circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example creditor circuitry 206 of FIG. 2 receives the identified station and determines whether to credit the station and/or associated media, or to credit a generic identifier. The decision is based on the received SID and the receivability table 106. The generic identifier may be referred to as All Other Tuning (AOT) and/or All Other Code (AOC). The example creditor circuitry 206 is explored further in FIG. 4.

In some examples, the receivability controller circuitry 110 includes means for determining whether an example receivability table 106 includes a given station identifier. For example, the means for determining may be implemented by example creditor circuitry 206. In some examples, the example creditor circuitry 206 may be implemented by machine executable instructions such as that implemented by at least blocks 406-410 of FIG. 4 executed by processor circuitry, which may be implemented by the example processor circuitry 512 of FIG. 5, the example processor circuitry 600 of FIG. 6, and/or the example Field Programmable Gate Array (FPGA) circuitry 700 of FIG. 7. In other examples, the example receivability controller circuitry 110 is implemented by other hardware logic circuitry, hardware implemented state machines, and/or any other combination of hardware, software, and/or firmware. For example, the example receivability controller circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example counter circuitry 208 counts the number of credits to AOC and/or AOT. In the example receivability controller circuitry 110, a single count is used to describe the number of times any SID has been credited to AOC and/or AOT. In some examples, a count is recorded for each unique SID to be credited to AOC and/or AOT. The example counter circuitry 208 additionally checks to see if the count exceeds a threshold.

In the example receivability controller circuitry 110, when the AOC and/or AOT is credited, the example counter circuitry 208 updates the count and additionally stores the SID and the codes and/or signatures that caused the accreditation. This additional information is stored in the example receivability database 212. An accurate count of SIDs is used to determine when the receivability table 106 should be updated. By recording the relevant SID and codes and/or signatures, the information may be used later to credit the relevant station and/or associated media.

The example receivability identifier circuitry 210 determines whether a given station is receivable at the panelist household 102. Factors used to make the determination may include but are not limited to the delivery source (e.g., a service provider), regional receivability, lineup, and any associated offering levels offered by the delivery source. If the given station is receivable at the panelist household 102, the example receivability identifier circuitry 210 updates the receivability table 106 by adding the station to the table.

In some examples, the receivability controller circuitry 110 includes means for determining whether a given station is receivable at the panelist household 102 and means for updating the household receivability table. For example, the means for determining and means for updating may be implemented by example receivability identifier circuitry 210. In some examples, the example receivability identifier circuitry 210 may be implemented by machine executable instructions such as that implemented by at least block 418, 422 of FIG. 4 executed by processor circuitry, which may be implemented by the example processor circuitry 512 of FIG. 5, the example processor circuitry 600 of FIG. 6, and/or the example Field Programmable Gate Array (FPGA) circuitry 700 of FIG. 7. In other examples, the example receivability identifier circuitry 210 is implemented by other hardware logic circuitry, hardware implemented state machines, and/ or any other combination of hardware, software, and/or firmware. For example, the receivability identifier circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example receivability database 212 receives and stores the receivability table 106 from the employee 104. The example receivability database 212 also receives and stores the count and codes and/or signatures from the example counter circuitry 208, as well as updates from the example receivability identifier circuitry 210. In the example system 100, one panelist household 102 generates one receivability table 106. In other examples, multiple panelist households each generate a receivability table. The example receivability database 212 stores a receivability table 106 for each panelist household 102 in any example.

The example receivability database 212 is implemented by any memory, storage device and/or storage disc for storing data such as, for example, flash memory, magnetic media, optical media, solid state memory, hard drive(s), thumb drive(s), etc. Furthermore, the data stored in the example receivability database 212 may be in any data format such as, for example, binary data, comma delimited data, tab delimited data, structured query language (SQL) structures, etc. While the example receivability database 212 is illustrated as a single device in FIG. 2, the example receivability database 212 and/or any other data storage devices described herein may be implemented by any number and/or type(s) of memories.

When the example creditor circuitry 206 credits a generic identifier, the example counter circuitry 208 updates the count. If the count exceeds a threshold, the example station identifier circuitry 204 identifies one or more SIDs that have been stored during due to a credit to AOC and/or AOT. For each identified SID, the example receivability identifier circuitry 210 determines whether the SID is receivable at the panelist household 102. If the SID is receivable, then the example receivability identifier circuitry 210 updates the receivability table 106 by adding the identified station. In response to the update, the example creditor circuitry 206 credits the station and any associated media by accessing the codes and/or signatures that were saved in the example receivability database 212 when the SID was previously credited to AOC and/or AOT. The table updating and re-crediting process is explored further in FIG. 4.

In examples where the example counter circuitry 208 records a count for each unique SID to be credited to AOC and/or AOT, any count that exceeds a threshold will identify a single SID. The example receivability identifier circuitry 210 would then determine if the single SID is receivable at the panelist household 102.

Figure 3:
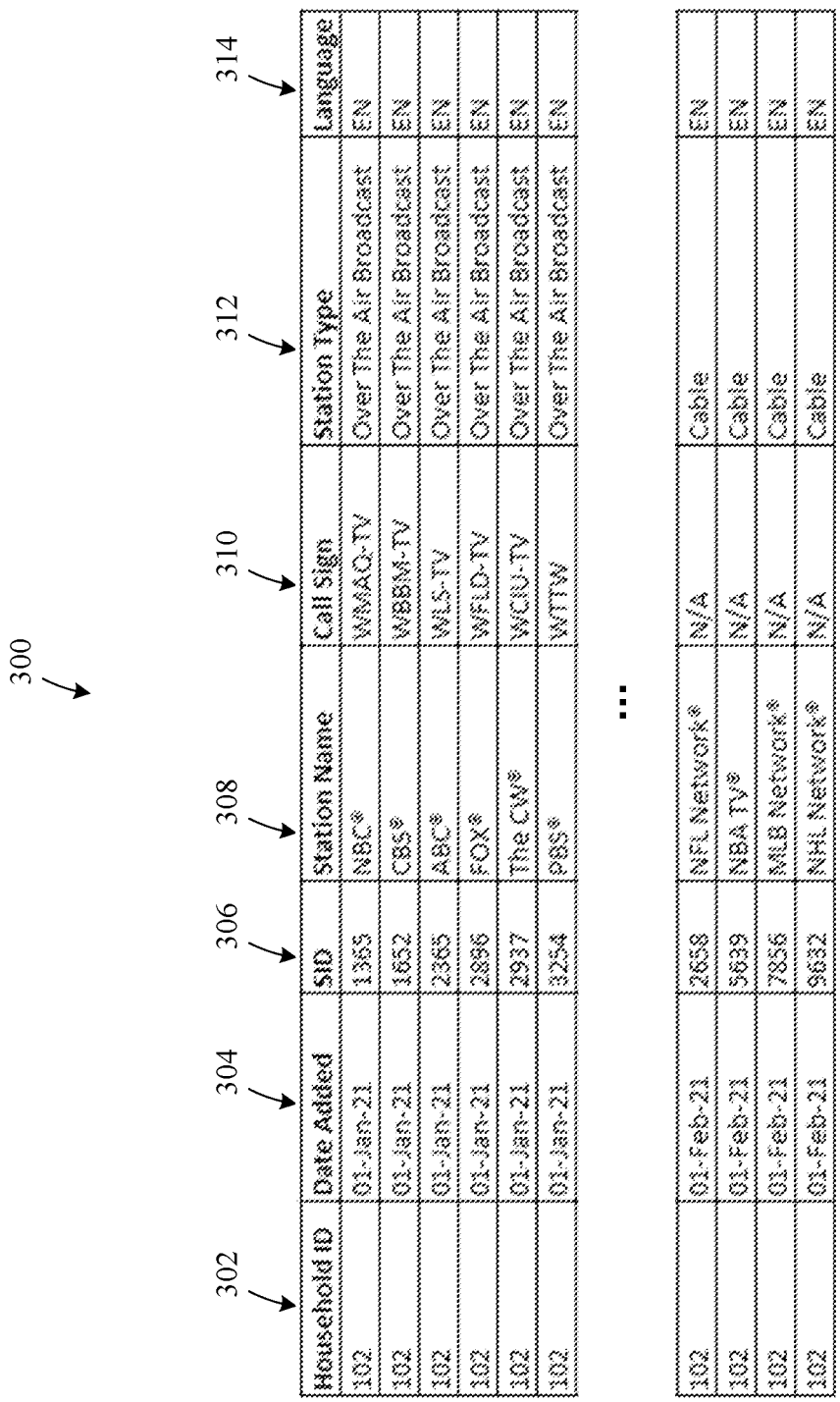
FIG. 3 is an example data set that may be used to implement the receivability table of FIG. 1.

FIG. 3 is an example data set that may be used to implement the receivability table of FIG. 1. The example data set 300 is formatted in FIG. 3 as a table for simplicity. In some examples, information that composes the example receivability table 106 may be stored in any format accepted by the example receivability database 212 as described previously. The example data set 300 has multiple rows, where information from each row is stored together in the example receivability database 212 as a single entry to the example receivability table 106. The example data set 300 includes a Household ID 302, a Date Added 304, a Station Name 306, SID 308, Call Sign 310, Station Type 312, and Language 314.

The Household ID 302 is a value used to uniquely identify a panelist household. In the example data set 300, all the illustrated rows represent receivable stations at the panelist household 102. As a result, the same value representing panelist household 102 is stored in all entries of the Household ID 302. In some examples, the example receivability table 106 contains data from multiple panelist households. In some such examples, more than one value may be saved in the Household ID 302 entries. In the example data set 300, the Household ID 302 is an integer value. In some examples, a value of any format may be used to uniquely identify a panelist household. Examples of additional value formats include strings, floats, etc.

Information in the example receivability table 106 may be stored in any order. In the example data set 300, the rows are ordered first by Household ID 302, then Date Added 304, and finally by SID 306. In some examples, a different order is used.

The Date Added 304 on a given row indicates when information from that row was added to the example receivability table 106. The example data set 300 represents a scenario where the employee 104 installed the meter in the panelist household 102 and generated the initial example receivability table 106 on Jan. 1, 2021. While the example data set 300 shows only six entries from Jan. 1, 2021 for simplicity, the ellipses of FIG. 3 indicate that any number of additional stations may have been added to the example data set 300 during meter installation. The data added 304 entries also show that the example receivability table 106 was updated on Feb. 1, 2021, to include four additional rows.

The SID 306 is a value that identifies a station name 308, independent of a service provider or lineup. In the example data set 300, the SID 306 is an integer. In some examples, a SID 306 may be a value of any format. Examples of additional value formats include strings, floats, etc. The Call Sign 308, Station Type 310, and Language 312 in the example data set 300 are examples of station metadata that may be included in the example receivability table 106. Station metadata is additional information that may be used when crediting a station and/or associated media. A given row may or may not include certain metadata. For example, the Station Type 312 entries indicate that the stations added Feb. 1, 2021, are not available through over the air broadcasting. As a result, they may not have a Call Sign 310. In some examples, additional or alternative session metadata may be stored in the example receivability table 106.

The example data set 300 implements the example receivability table 106. Between meter installation and Feb. 1, 2021, example panelists added the NFL Network®, NBA TV®, MLB Network®, and NHL Network® to one or more televisions in the panelist household 102. Because entries for the household ID 302 representing the panelist household 102 did not initially list these stations, the stations and/or associated media could not be credited before Feb. 1, 2021. By updating the example receivability table 106 in a timely manner, the receivability controller circuitry 110 can credit the new stations and/or associated media for both previous and future generated codes and/or signatures in a timely manner. Timely crediting is advantageous to the example AME, which uses the credit information to determine ratings and/or perform further analysis.

Figure 4:
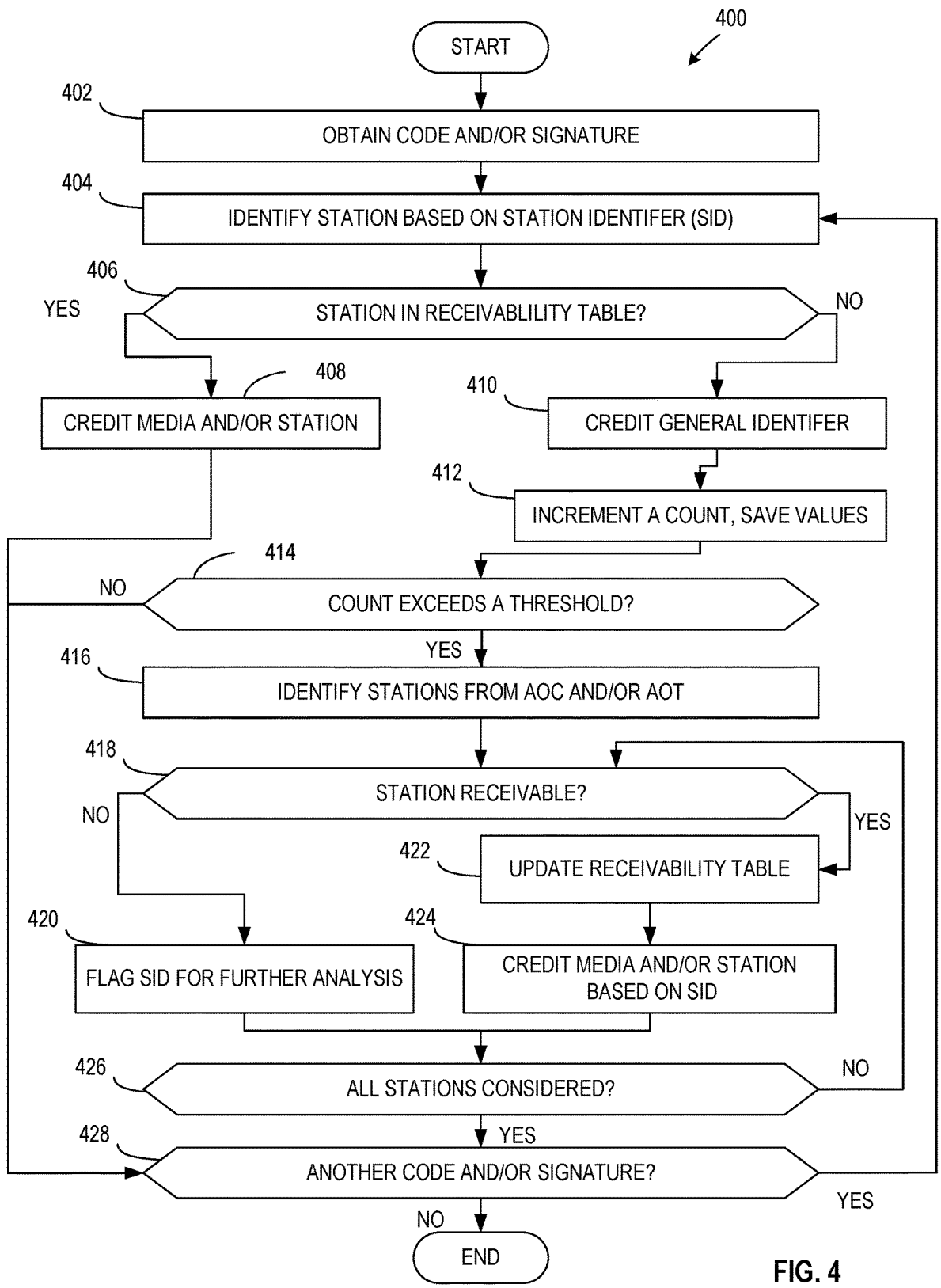
FIG. 4 is a flowchart representative of example machine readable instructions that may be executed by example processor circuitry to implement the example receivability controller circuitry of FIG. 1.

While an example manner of implementing the example receivability controller circuitry 110 of FIG. 1 is illustrated in FIG. 4, one or more of the elements, processes, and/or devices illustrated in FIG. 4 may be combined, divided, re-arranged, omitted, eliminated, and/or implemented in any other way. Further, the example data handler circuitry 202, example station identifier circuitry 204, example creditor circuitry 206, example counter circuitry 208, example receivability identifier circuitry 210, and/or, more generally, the example receivability controller circuitry 110 of FIG. 1, may be implemented by hardware, software, firmware, and/or any combination of hardware, software, and/or firmware. Thus, for example, any of the example data handler circuitry 202, example station identifier circuitry 204, example creditor circuitry 206, example counter circuitry 208, example receivability identifier circuitry 210, example receivability database 212, and/or, more generally, the example receivability controller circuitry 110 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data handler circuitry 202, example station identifier circuitry 204, example creditor circuitry 206, example counter circuitry 208, example receivability identifier circuitry 210, example receivability database 212, and/or, more generally, the example receivability controller circuitry 110 of FIG. 1, is/are hereby expressly defined to include a non-transitory computer readable storage device or storage disk such as a memory, a digital versatile disk (DVD), a compact disk (CD), a Blu-ray disk, etc., including the software and/or firmware. Further still, the example receivability controller circuitry 110 of FIG. 1 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the example receivability controller circuitry 110 of FIG. 1 is shown in FIG. 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example receivability controller circuitry 110 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions that may be executed by example processor circuitry to implement the example receivability controller circuitry of FIG. 1. The example process 400 begins when the example data handler circuitry 202 receives collected codes and/or signatures. (Block 402). The collected codes and/or signatures are received from the audio/visual data of a viewing session in the panelist household 102. The collected codes and/or signatures identify a media and station viewed during the viewing session. The collected codes and/or signatures are provided by the meter in the panelist household 102 via the example network 108.

The example station identifier circuitry 204 uses the collected codes and/or signatures to identify a station (Block 404). The identified station is associated with a SID that is present within the codes and/or signatures. The example station identifier circuitry 204 provides the identified station to the example creditor circuitry 206.

The example creditor circuitry 206 accesses the example receivability database 212 to determine whether the identified station is listed in the receivability table 106. (Block 406). If the identified station is listed in the receivability table 106, the example creditor circuitry 206 credits the station and/or associated media. (Block 408). The example process 400 then continues at block 428.

If the identified station is not listed in the receivability table 106, the example creditor circuitry 206 credits a generic identifier (e.g., an AOC or AOT identifier). (Block 410). In response to a credit to the generic identifier, the example counter circuitry increments a counter (Block 412). The example counter circuitry 208 increments the count for each credit to AOC and/or AOT. The example counter circuitry 208 stores the count, the SID of block 404, and the codes and/or signatures of block 402 in the example receivability database 212. (Block 412).

The example counter circuitry 208 identifies if the incremented count of block 412 exceeds a threshold. (Block 414). This threshold is set by the example AME and stored in the example receivability database 212. If the count does not exceed the threshold, the example process 400 continues at block 428.

If the count does exceed the threshold, the example station identifier circuitry 204 identifies one or more SIDs in the example receivability database 212 that have been stored due to a credit to AOC and/or AOT. (Block 416). The example station identifier circuitry 204 provides a single SID from the one or more SIDs to the example receivability identifier circuitry 210.

The example receivability identifier circuitry 210 determines whether the identified station corresponding to the received SID is receivable in the panelist household 102. (Block 418). Factors used to make the determination may include but are not limited to the delivery source, regional receivability, lineup, and any associated offering levels offered by the delivery source.

If the example receivability identifier circuitry 210 determines that the identified station is not receivable, the SID is flagged for further analysis. (Block 420). In some examples, the further analysis involves the employee 104. In other examples, the further analysis is automated by the AME. The example process 400 then continues at block 426.

If the example receivability identifier circuitry 210 determines that the station is receivable, it updates the receivability table 106. (Block 422). This is done by adding the station to the receivability table 106 within the example receivability database 212. The updated receivability table 106 enables the example creditor circuitry 206 to re-analyze any set of codes and/or signatures that contain the matching SID. (Block 424). This information was saved in the example receivability database 212 by the example counter circuitry 208. (Block 412). When the example creditor circuitry re-analyzes any set of codes and signatures with the matching SID, the station and/or any associated media are credited.

The example station identifier circuitry 204 determines if all identified stations have been considered by the example receivability identifier circuitry 210. (Block 426). If all identified stations have been considered, the example process continues to block 428. If all identified stations have not been considered, the example station identifier circuitry 204 provides a new SID from the one or more SIDs, and the example process continues at block 418 when the example receivability identifier circuitry 210 determines if the new SID is receivable.

The example data handler circuitry 202 determines if another code and/or signature has been received from the panelist household 102. (Block 428). If another code and/or signature has been received, the example process 400 continues at block 404 where the example station identifier circuitry 204 identifies a station of the new code and/or signature. If another code and/or signature has not been received, the example process 400 ends.

Figure 5:
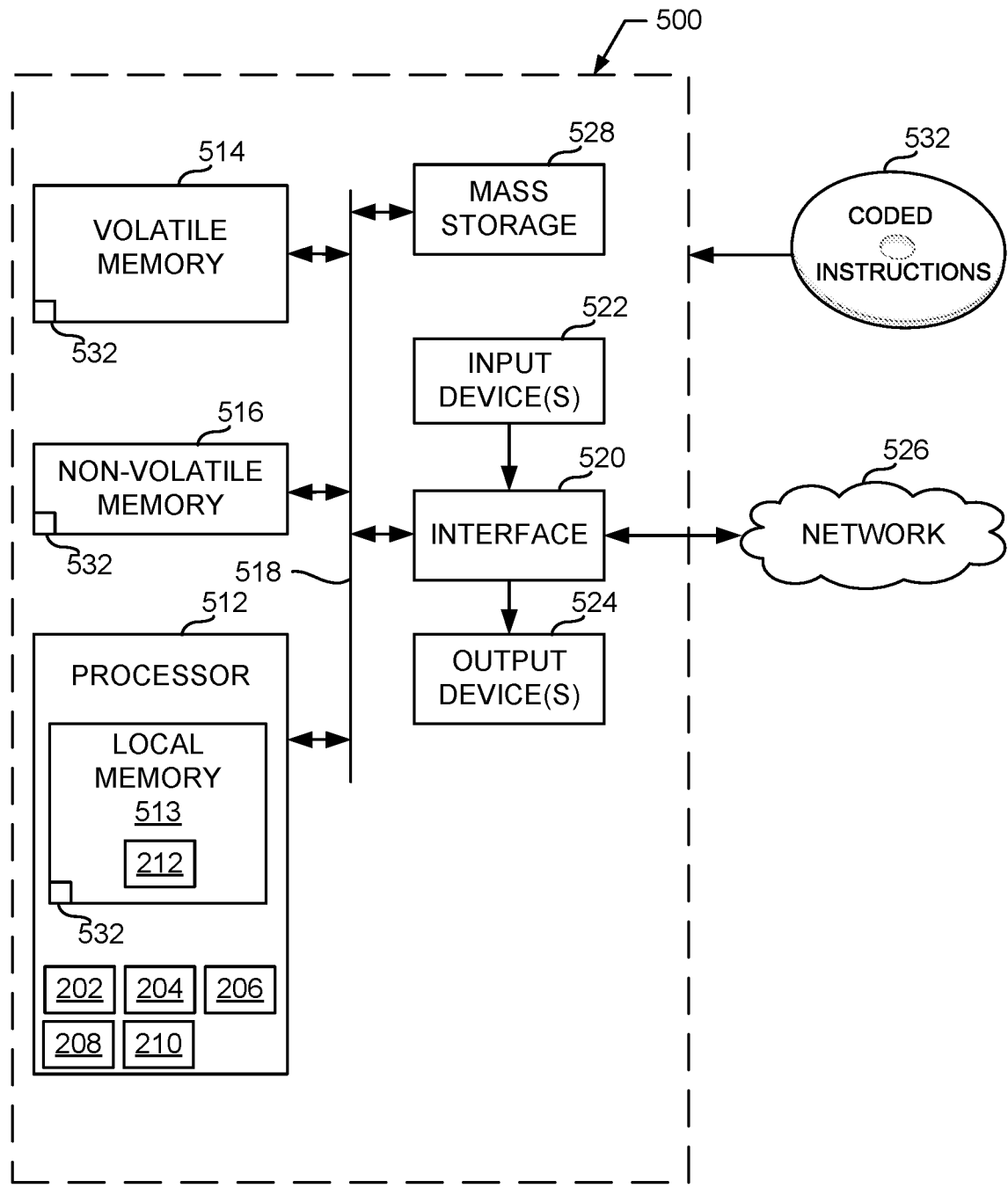
FIG. 5 is a block diagram of an example processing platform including processor circuitry structured to execute the example machine readable instructions of FIG. 4 to implement the example receivability controller circuitry of FIG. 1.

FIG. 5 is a block diagram of an example processor platform 500 structured to execute and/or instantiate the machine readable instructions and/or operations of FIG. 4 to implement the example receivability controller circuitry 110 of FIG. 1. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements data handler circuitry 202, example station identifier circuitry 204, example creditor circuitry 206, example counter circuitry 208, example receivability identifier circuitry 210, and/or, more generally, the example receivability controller circuitry 110 of FIG. 1.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of FIG. 4, may be stored in the mass storage device 528, in the volatile memory 514, in the non-volatile memory 516, and/or on a removable non-transitory computer readable storage medium such as a CD or DVD.

Figure 6:
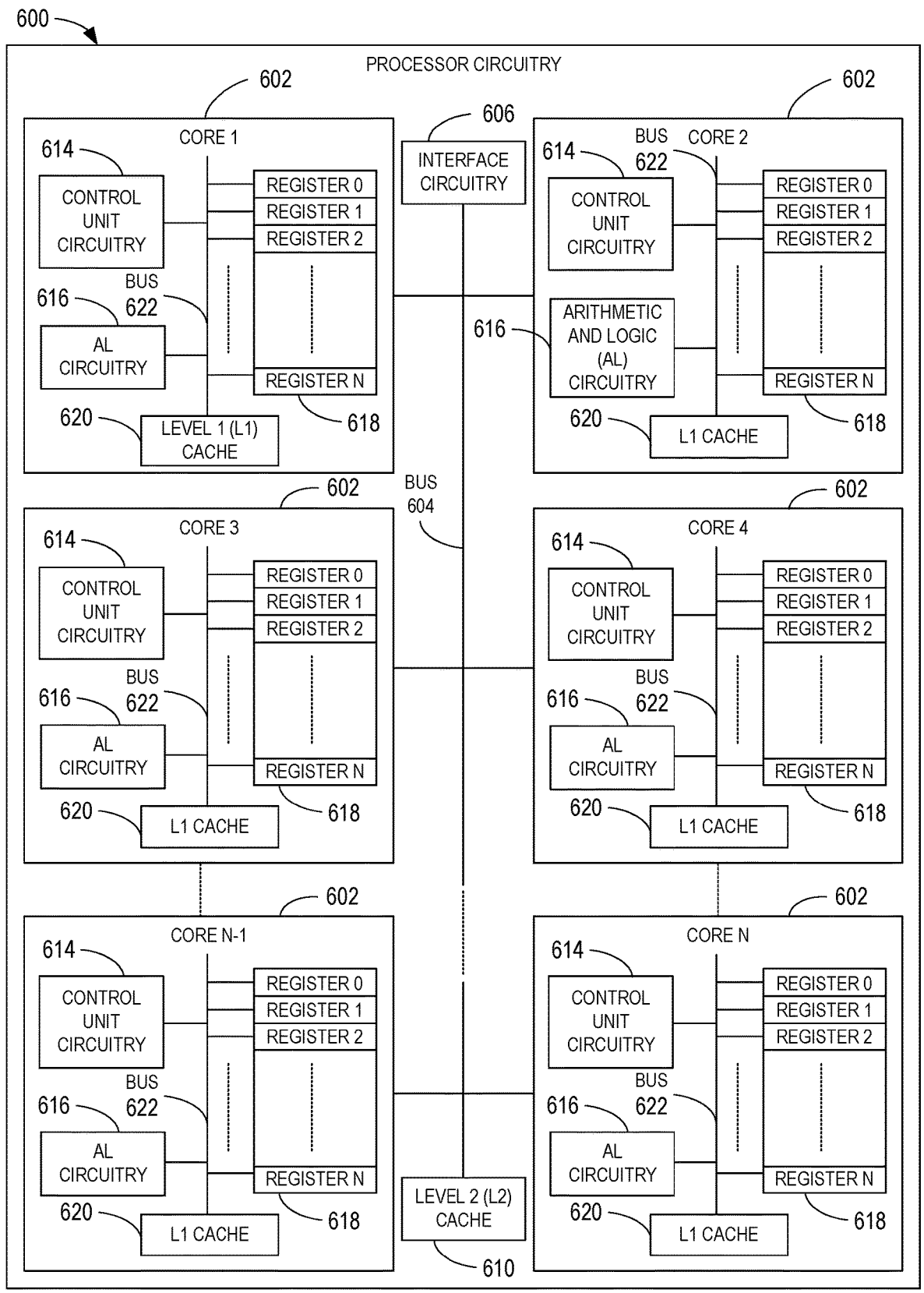
FIG. 6 is a block diagram of an example implementation of the processor circuitry of FIG. 4.

FIG. 6 is a block diagram of an example implementation of the processor circuitry 512 of FIG. 5. In this example, the processor circuitry 512 of FIG. 5 is implemented by a microprocessor 600. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 4.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The bus 620 may implement at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
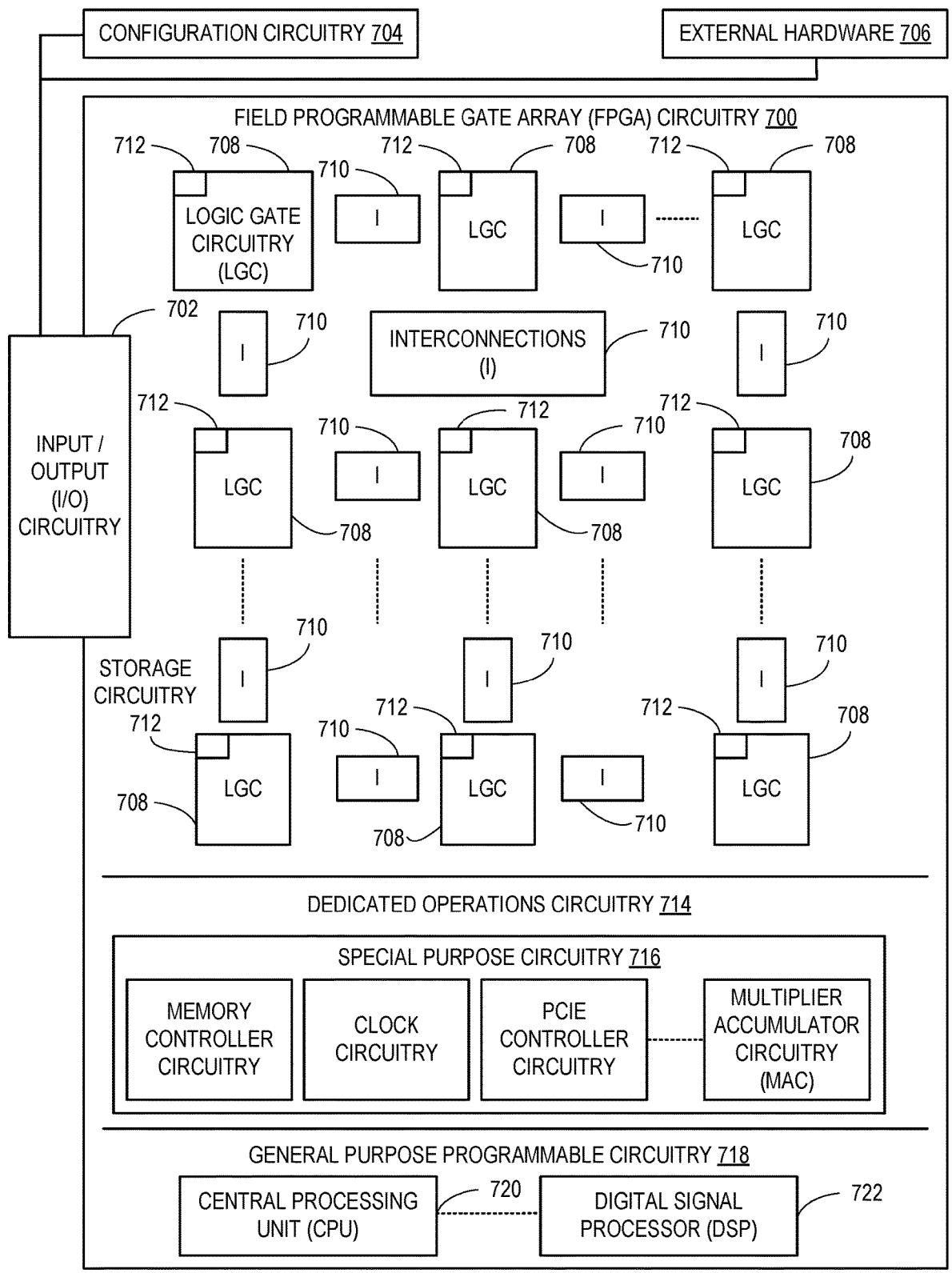
FIG. 7 is a block diagram of another example implementation of the processor circuitry of FIG. 4.
Figure 8:
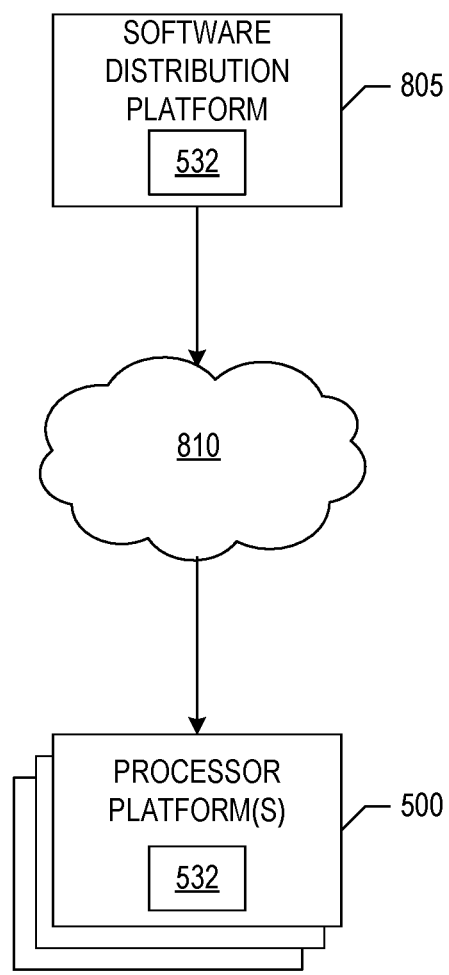
FIG. 8 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 7 is a block diagram of another example implementation of the processor circuitry 512 of FIG. 5. In this example, the processor circuitry 512 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowchart of FIG. 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 4. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 700 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may implement the microprocessor 600 of FIG. 6. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIG. 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 4 may be executed by one or more of the cores 602 of FIG. 6 and a second portion of the machine readable instructions represented by the flowchart of FIG. 4 may be executed by the FPGA circuitry 700 of FIG. 7.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

A block diagram illustrating an example software distribution platform 805 to distribute software such as the example machine readable instructions 532 of FIG. 5 to hardware devices owned and/or operated by third parties is illustrated in FIG. 4. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 302-328 of FIG. 4, as described above. The one or more servers of the example software distribution platform 805 are in communication with a network 810, which may correspond to any one or more of the Internet and/or any of the example networks 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 302-328 of FIG. 4, may be downloaded to the example processor platform 500, which is to execute the machine readable instructions 532 to implement the example receivability controller circuitry 110. In some example, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that automate receivability updates for media crediting. The disclosed systems, methods, apparatus, and articles of manufacture improve the efficiency of using a computing device by saving time and cost in comparison to known methods where the employee 104 manually updates the receivability table 106. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example 1 includes an apparatus to automate receivability updates for media crediting comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the one or more first operations, the one or more second operations or the one or more third operations to instantiate station identifier circuitry to identify a station identifier associated with at least one of a signature or a code, the at least one of the signature or the code collected at a panelist household, creditor circuitry to determine whether a household receivability table includes the station identifier, and receivability identifier circuitry to in response to a determination that the household receivability table does not include a station corresponding to the station identifier, determine whether the station is receivable at the panelist household, and in response to a determination that the station is receivable at the panelist household, update the household receivability table.

Example 2 includes the apparatus of example 1, wherein the creditor circuitry is to, in response to the determination that the station identifier is listed in the household receivability table, credit the station.

Example 3 includes the apparatus of example 1, wherein the creditor circuitry is to, in response to the determination that the station identifier is not listed in the household receivability table, credits a generic identifier.

Example 4 includes the apparatus of example 3, wherein the generic identifier is at least one of an all other code identifier or an all other tuning identifier.

Example 5 includes the apparatus of example 3, wherein the processor circuitry is further to instantiate counter circuitry to increment a count in response to the generic identifier being credited.

Example 6 includes the apparatus of example 5, wherein the station identifier circuitry is to further identify the station in response to the count exceeding a threshold.

Example 7 includes the apparatus of example 1, wherein the receivability identifier circuitry is to determine whether the station is receivable at the panelist household based on at least one of a delivery source of the station, a regional receivability of the panelist household, or a lineup.

Example 8 includes At least one non-transitory machine-readable medium comprising instructions that, when executed, cause at least one processor to at least identify a station identifier associated with at least one of a signature or a code, the at least one of the signature or the code collected at a panelist household, determine whether a household receivability table includes the station identifier, determine, in response to a determination that the household receivability table does not include a station corresponding to the station identifier, whether the station is receivable at the panelist household, and update the household receivability table, the update in response to a determination that the station corresponding to the station identifier is receivable at the panelist household.

Example 9 includes the at least one non-transitory machine-readable medium of example 8, wherein the instructions, when executed, cause the at least one processor to, in response to the determination that the station identifier is listed in the household receivability table, credit the station.

Example 10 includes the at least one non-transitory machine-readable medium of example 8, wherein the instructions, when executed, cause the at least one processor to, in response to the determination that the station identifier is not listed in the household receivability table, credit a generic identifier.

Example 11 includes the at least one non-transitory machine-readable medium of example 10, wherein the generic identifier is at least one of an all other code identifier or an all other tuning identifier.

Example 12 includes the at least one non-transitory machine-readable medium of example 10, wherein the instructions, when executed, cause the at least one processor to increment a count in response to the generic identifier being credited.

Example 13 includes the at least one non-transitory machine-readable medium of example 12, wherein the instructions, when executed, cause the at least one processor to further identify the station in response to the count exceeding a threshold.

Example 14 includes the at least one non-transitory machine-readable medium of example 8, wherein the instructions, when executed, cause the at least one processor to determine whether the station is receivable at the panelist household based on at least one of a delivery source of the station, a regional receivability of the panelist household, or a lineup.

Example 15 includes an apparatus for automating receivability updates for media crediting, the apparatus comprising means for identifying a station identifier associated with at least one of a signature or a code, the at least one of the signature or the code collected at a panelist household, means for determining whether a household receivability table includes the station identifier, means for determining whether a station is receivable at the panelist household, the means for determining whether the station is receivable at the panelist household in response to a determination that the household receivability table does not include the station corresponding to the station identifier, and means for updating the household receivability table, the update in response to a determination that the station corresponding to the station identifier is receivable at the panelist household.

Example 16 includes the apparatus of example 15, further including means for crediting the station, the means for crediting the station in response to the determination that the station identifier is listed in the household receivability table.

Example 17 includes the apparatus of example 15, further including means for crediting a generic identifier, the means for crediting a generic identifier in response to the determination that the station identifier is not listed in the household receivability table.

Example 18 includes the apparatus of example 17, wherein the generic identifier is at least one of an all other code identifier or an all other tuning identifier.

Example 19 includes the apparatus of example 17, further including means for incrementing a count in response to the generic identifier being credited.

Example 20 includes the apparatus of example 19, wherein the means for identifying further identify the station in response to the count exceeding a threshold.

Example 21 includes the apparatus of example 15, wherein the means for determining whether the station is receivable at the panelist household based on at least one of a delivery source of the station, a regional receivability of the panelist household, or a lineup.

Example 22 includes a method for automating receivability updates for media crediting, the method comprising identifying a station identifier associated with at least one of a signature or a code, the at least one of the signature or the code collected at a panelist household, determining whether a household receivability table includes the station identifier, determining whether the station is receivable at the panelist household, the determining whether the station is receivable at the panelist household in response to a determination that the household receivability table does not include a station corresponding to the station identifier, and updating the household receivability table, the update in response to a determination that the station corresponding to the station identifier is receivable at the panelist household.

Example 23 includes the method of example 22, further including crediting the station, the crediting in response to determining the station identifier is listed in the household receivability table.

Example 24 includes the method of example 22, further including crediting a generic identifier, the crediting in response to determining the station identifier is not listed in the household receivability table.

Example 25 includes the method of example 24, wherein the generic identifier is at least one of an all other code identifier or an all other tuning identifier.

Example 26 includes the method of example 24, further including incrementing a count in response to the generic identifier being credited.

Example 27 includes the method of example 26, wherein the identifying further includes identifying the station in response to the count exceeding a threshold.

Example 28 includes the method of example 22, wherein the determining whether the station is receivable at the panelist household is based on at least one of a delivery source of the station, a regional receivability of the panelist household, or a lineup.

The following claims are hereby incorporated into this Detailed Description by this reference, with each claim standing on its own as a separate embodiment of the present disclosure.

What is claimed is:

1. An audience measurement computing system comprising:
    at least one processor; and
    memory storing instructions that, when executed by the at least one processor, cause the audience measurement computing system to perform a set of operations, the operations comprising at least:
        determining a station identifier associated with a media station corresponding to panelist media identifying information obtained from a panelist-associated device;
        comparing the determined station identifier with one or more entries of a data table corresponding to the panelist-associated device;
        making a determination, based on the comparing, that the determined station identifier is not included in the data table;
        responsive to making the determination, determining that the media station is available to the panelist-associated device; and
        responsive to determining that the media station is available to the panelist-associated device, updating the data table to include the determined station identifier.

2. The audience measurement computing system of claim 1, wherein the station identifier is determined based on a comparison between the panelist media identifying information and reference media identifying information.

3. The audience measurement computing system of claim 1, wherein the panelist-associated device is an audience measurement meter that generates the panelist media identifying information based on an audio portion of the media station.

4. The audience measurement computing system of claim 1, wherein the determining that the media station is available to the panelist-associated device includes determining that the media station is receivable at a household associated with the panelist-associated device.

5. The audience measurement computing system of claim 4, wherein the determining that the media station is receivable at the household includes determining that the media station is receivable at the household based on a comparison between a geographic location of the household and information indicating a regional receivability of the media station.

6. The audience measurement computing system of claim 1, wherein the determining that the media station is available to the panelist-associated device includes determining that the media station is available to the panelist-associated device based on information indicating a delivery source of the media station.

7. The audience measurement computing system of claim 1, wherein the operations further include determining that a threshold extent of instances of panelist media identifying information corresponding to the determined station identifier has occurred, and wherein the updating the data table to include the determined station identifier is in response to the determining that the threshold extent of instances has occurred.

8. The audience measurement computing system of claim 1, wherein the operations further include crediting an impression of the media station associated with the panelist-associated device.

9. A method comprising:
   determining a station identifier associated with a media station corresponding to panelist media identifying information obtained from a panelist-associated device;
   comparing the determined station identifier with one or more entries of a data table corresponding to the panelist-associated device;
   making a determination, based on the comparing, that the determined station identifier is not included in the data table;
   responsive to making the determination, determining that the media station is available to the panelist-associated device; and
   responsive to determining that the media station is available to the panelist-associated device, updating the data table to include the determined station identifier.

10. The method of claim 9, wherein the station identifier is determined by comparing the panelist media identifying information with reference media identifying information.

11. The method of claim 10, wherein the comparing the panelist media identifying information with reference media identifying information includes comparing an audio signature obtained by the panelist-associated device during playback of the media station with one or more reference signatures corresponding to media stations indicated by the one or more entries of the data table.

12. The method of claim 9, wherein the panelist-associated device is an audience measurement meter that generates the panelist media identifying information based on an audio portion of the media station.

13. The method of claim 9, wherein the determining that the media station is available to the panelist-associated device includes determining that the media station is receivable at a household associated with the panelist-associated device.

14. The method of claim 9, further including determining that a threshold extent of instances of panelist media identifying information corresponding to the determined station identifier has occurred, and wherein the updating the data table to include the determined station identifier is in response to the determining that the threshold extent of instances has occurred.

15. The method of claim 9, further including crediting an impression of the media station associated with the panelist-associated device.

16. A non-transitory computer readable storage medium having stored thereon instructions that, when executed by at least one processor, cause performance of a set of operations, the operations comprising:
   determining a station identifier associated with a media station corresponding to panelist media identifying information obtained from a panelist-associated device;
   comparing the determined station identifier with one or more entries of a data table corresponding to the panelist-associated device;
   making a determination, based on the comparing, that the determined station identifier is not included in the data table;
   responsive to making the determination, determining that the media station is available to the panelist-associated device; and
   responsive to determining that the media station is available to the panelist-associated device, updating the data table to include the determined station identifier.

17. The non-transitory computer readable storage medium of claim 16, wherein the station identifier is determined by comparing the panelist media identifying information with reference media identifying information.

18. The non-transitory computer readable storage medium of claim 16, wherein the panelist-associated device is an audience measurement meter that generates the panelist media identifying information based on an audio portion of the media station.

19. The non-transitory computer readable storage medium of claim 16, wherein the determining that the media station is available to the panelist-associated device includes determining that the media station is receivable at a household associated with the panelist-associated device.

20. The non-transitory computer readable storage medium of claim 16, further including determining that a threshold extent of instances of panelist media identifying information corresponding to the determined station identifier has occurred, and wherein the updating the data table to include the determined station identifier is in response to the determining that the threshold extent of instances has occurred.

* * * * *